United States Patent
Rajan et al.

(10) Patent No.: US 7,107,385 B2
(45) Date of Patent: Sep. 12, 2006

(54) STORAGE VIRTUALIZATION BY LAYERING VIRTUAL DISK OBJECTS ON A FILE SYSTEM

(75) Inventors: Vijayan Rajan, Sunnyvale, CA (US); Mohan Srinivasan, Cupertino, CA (US); Brian Pawlowski, Palo Alto, CA (US); David Brittain Bolen, Durham, NC (US); Blake H. Lewis, Los Altos Hills, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 198 days.

(21) Appl. No.: 10/216,453

(22) Filed: Aug. 9, 2002

(65) Prior Publication Data

US 2004/0030822 A1 Feb. 12, 2004

(51) Int. Cl.
*G06F 3/06* (2006.01)

(52) U.S. Cl. .............................. 711/4; 711/112; 709/217
(58) Field of Classification Search ................ 711/711, 711/112, 114, 4; 709/219, 217; 707/100
See application file for complete search history.

(56) References Cited

U.S. PATENT DOCUMENTS

| | | | | |
|---|---|---|---|---|
| 4,843,541 A | * | 6/1989 | Bean et al. ................ 710/36 |
| 4,916,608 A | * | 4/1990 | Shultz ..................... 718/104 |
| 5,129,088 A | * | 7/1992 | Auslander et al. ........... 711/1 |
| 5,163,131 A | | 11/1992 | Row et al. ................ 709/202 |
| 5,355,453 A | | 10/1994 | Row et al. ................ 709/219 |
| 5,485,579 A | | 1/1996 | Hitz et al. ................ 709/221 |
| 5,511,177 A | * | 4/1996 | Kagimasa et al. ......... 711/114 |
| 5,802,366 A | | 9/1998 | Row et al. ................ 709/250 |
| 5,819,292 A | * | 10/1998 | Hitz et al. ................ 707/203 |
| 5,897,661 A | * | 4/1999 | Baranovsky et al. ....... 711/170 |
| 5,918,229 A | * | 6/1999 | Davis et al. ................ 707/10 |
| 5,931,918 A | | 8/1999 | Row et al. ................ 719/321 |
| 5,941,972 A | | 8/1999 | Hoese et al. .............. 710/315 |
| 5,987,477 A | * | 11/1999 | Schmuck et al. .......... 707/201 |
| 6,065,037 A | | 5/2000 | Hitz et al. ................ 709/200 |
| 6,185,655 B1 | | 2/2001 | Peping |
| 6,275,898 B1 | * | 8/2001 | DeKoning ................. 711/114 |
| 6,425,035 B1 | | 7/2002 | Hoese et al. .............. 710/105 |
| 6,526,478 B1 | * | 2/2003 | Kirby ....................... 711/114 |
| 6,606,690 B1 | * | 8/2003 | Padovano .................. 711/148 |
| 6,618,798 B1 | * | 9/2003 | Burton et al. ............. 711/202 |

(Continued)

OTHER PUBLICATIONS

Tanenbaum, "Structured Computer Organization", © 1984 Prentice-Hall, Inc., p. 10-12.*

(Continued)

*Primary Examiner*—Brian R. Peugh
(74) *Attorney, Agent, or Firm*—Cesari and McKenna, LLP

(57) ABSTRACT

A storage virtualization selection technique "automates" a virtualization selection process to create virtual disk (vdisk) storage objects over a volume of a file system implemented by a storage operating system of a multi-protocol storage appliance. The file system provides a virtualization system that aggregates physical storage of a set of disks or portions (e.g., extents) of disks into a pool of blocks that can be dynamically allocated to form a vdisk. The file system also provides reliability guarantees for the vdisks in accordance with its underlying architecture. That is, the file system organizes its storage within volumes created among the managed disks. The vdisk is thereafter created as a storage object within a volume and, thus, inherits the underlying reliability configuration associated with that volume. The portions are aggregated and allocated as a vdisk with reliability guarantees in response to a request to create the vdisk from a user of the storage appliance and without further user involvement.

97 Claims, 6 Drawing Sheets

U.S. PATENT DOCUMENTS

| | | | |
|---|---|---|---|
| 2002/0112022 A1 | 8/2002 | Kazar et al. | 709/217 |
| 2002/0116593 A1 | 8/2002 | Kazar et al. | 711/202 |
| 2003/0195942 A1* | 10/2003 | Muhlestein et al. | 709/215 |
| 2004/0093358 A1* | 5/2004 | Ito et al. | 707/200 |

OTHER PUBLICATIONS

Kim et al., "Volume Management in SAN Environment", © 2001 IEEE, p. 500-505.*

"Network Appliance Ends NAS/SAN War" by COMPUTERWIRE, http://www.theregister.co.uk/content/63/27368.html; posted on Feb. 10, 2002.

Maintenance Procedures ND (BC) nd-networks disk control Feb. 1985 p. 1.

Misc. Reference Manual Pages ND (4P) nd-network disk driver Jul. 26, 1985 p. 1-3.

Asante EN/SC Adapter Family Installation Guide May 1994 p. i-133.

Asante Desltop EN/SC Adapters User's Manual Apr. 1996 p. 2-2-C.1.

Performance Without Compromise: The Virtual Storage Architecture 1997 © 1997 Storage Computer Comporation p. 1-11.

Anthony J. McGregor Department of Computer Science, University of Waikato Dissertation: Block-Based Distributed File Systems Jul. 1997 p. 1-206.

Callagnan B. "NFS Version 3 Protocol Specification", Request for Comments (RFC) 1813 Jun. 1995.

International Search Report PCT/US03/23597, Mar. 9, 2004, 7 pages, International Searching Authority, Alexandria, Virginia, USA.

International Search Report PCT/US03/23597, Apr. 14, 2004, 8 pages, International Searching Authority, Alexandria, Virginia, USA.

Lu, Y. "Performance Study of ISCSI-Based Storage Subsystems", IEEE Communications Magazine, pp. 76-82, Aug. 2003.

* cited by examiner

STORAGE VIRTUALIZATION BY LAYERING VIRTUAL DISK OBJECTS ON A FILE SYSTEM

FIELD OF THE INVENTION

The present invention relates to storage systems and, in particular, to storage virtualization on a storage system, such as a multi-protocol storage appliance.

BACKGROUND OF THE INVENTION

A storage system is a computer that provides storage service relating to the organization of information on writable persistent storage devices, such as memories, tapes or disks. The storage system may be deployed within a storage area network (SAN) or a network attached storage (NAS) environment. When used within a NAS environment, the storage system may be embodied as a file server including an operating system that implements a file system to logically organize the information as a hierarchical structure of directories and files on, e.g., the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media (i.e., network) adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and placing of that storage on a network. However, the SAN storage system typically manages specifically assigned storage resources. Although storage can be grouped (or pooled) into zones (e.g., through conventional logical unit number or "lun" zoning, masking and management techniques), the storage devices are still pre-assigned by a user, e.g., a system administrator, to the storage system.

Storage virtualization generally involves the pooling of storage resources from multiple storage devices, such as physical disks, typically across a network by one or more storage systems to create a "user-defined volume". The term "volume" as conventionally used in a SAN environment implies a storage entity that is constructed (by a system administrator) by specifying physical disks and extents within those disks via operations that combine those extents/disks into a user-defined volume storage entity. An extent is a set of contiguously addressed blocks (or "slices") of storage within the specified physical disks. Such construction can occur on either the storage device or application server. Storage virtualization is often used as part of a SAN deployment, wherein the user-defined volume appears as a single storage entity to the operating system, regardless of the types of storage devices pooled. Virtualization thus separates the representation of storage to the operating system from the actual physical storage connected over the network.

Storage virtualization has many interpretations, including decoupling of physical disk size limitations and underlying physical structure from a user-defined volume corresponding to a disk or lun. Virtualization may also refer to management of luns, including defining underlying reliability guarantees of the storage. Commonly, this aspect of virtualization is accomplished through explicit mirroring or Redundant Array of Independent (or Inexpensive) Disks (RAID) protection levels to a lun that is formed from the storage pool. That is, the system administrator explicitly defines the underlying reliability guarantees of the constructed user-defined volume. It can be appreciated that this administrative procedure is complex, time consuming and, therefore, costly.

Virtualization may further denote the ability to modify an existing configuration of a lun (e.g., to increase its size) along with the performance characteristics of the lun. However, conventional physical disks and strategies that explicitly construct larger units of storage for use by clients may suffer performance limitations. For example, bandwidth to a user-defined volume constructed through explicit aggregation of a number of disks and/or "slices" (extents) of those disks may be limited by physical constraints of the underlying properties of the constructed volume.

Therefore, the conventional notion of storage virtualization involves presenting a view of storage (i.e., a user-defined volume) to a client wherein the volume is formed from extents of various disks accessible to the client that are selected by a user or system administrator. The selection process performed by the administrator generally includes (i) choosing the various extents from the disks associated with the storage accessible to the client, (ii) applying underlying reliability guarantees (such as RAID or mirroring) to those extents to ensure the reliability of the volume, and (iii) presenting those reliable extents as a single storage entity (e.g., disk or lun) to a client. The present invention is directed to efficiently carrying out a storage virtualization selection process on a storage system.

SUMMARY OF THE INVENTION

The present invention relates to a storage virtualization selection technique that "automates" a virtualization selection process to "layer" (create) virtual disk (vdisk) storage objects over a volume of a file system implemented by a storage operating system of a storage system, such as a multi-protocol storage appliance. Broadly stated, the file system provides a virtualization system that aggregates physical storage of a set of disks or portions (e.g., extents) of disks into a pool of blocks that can be dynamically allocated to form a vdisk. The file system also provides reliability guarantees for the vdisks in accordance with its underlying architecture. That is, the file system organizes its storage within volumes created among the managed disks. The vdisk is thereafter created as a storage object within a volume and, thus, inherits the underlying reliability configuration associated with that volume. Notably, the portions are aggregated and allocated as a vdisk with reliability guarantees in response to a request to create the vdisk from a user of the storage appliance, such as a system administrator, and without further involvement of the user.

According to an aspect of the invention, the technique further provides an on-disk representation of a vdisk for a file system. A vdisk is a special file type in a volume that derives from a plain (regular) file, but that has associated export controls and operation restrictions that support emulation of a disk. Specifically, the vdisk is a multi-inode object comprising a special file inode and at least one associated stream inode that are managed as a single "encapsulated" storage object within the file system. The special file inode functions as a main container for storing data associated with the emulated disk. The stream inode functions as a persistent store for storing various attributes which allow the vdisk to be exported as a logical unit number (lun) to, e.g., storage area network (SAN) clients. These attributes include security information that also allow the encapsulated vdisk to persist, e.g., over reboot operations, and enable management of the vdisk as a single disk object in relation to the SAN clients.

Advantageously, the underlying reliability configuration of a volume defines the reliability characteristics of a vdisk created within that volume. This "inherited" reliability approach of the multi-protocol appliance simplifies management of the vdisk because a user (system administrator) does not have to address the reliability issue on a storage object (vdisk) basis. Rather, the system administrator need merely render global choices of reliability with respect to an entire volume.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
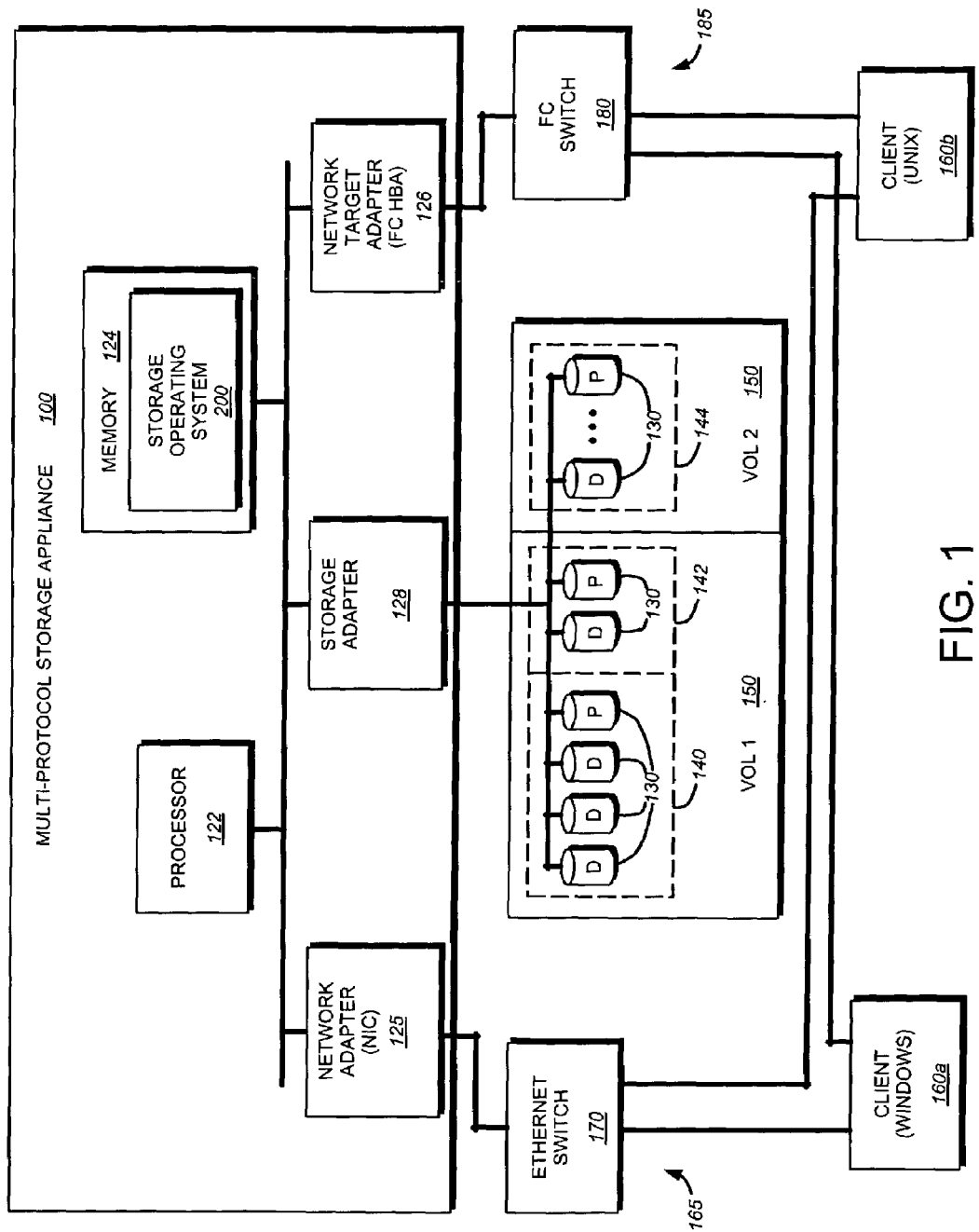
FIG. 1 is a schematic block diagram of a multi-protocol storage appliance that may be advantageously used with the present invention.

FIG. 1 is a schematic block diagram of a multi-protocol storage appliance 100 that may be advantageously used with the present invention. The multi-protocol storage appliance is configured to provide storage service for both file and block protocol access to information stored on storage devices in an integrated manner. In this context, the integrated multi-protocol appliance denotes a computer having features such as simplicity of storage service management and ease of storage reconfiguration, including reusable storage space, for users (system administrators) and clients of network attached storage (NAS) and storage area network (SAN) deployments.

The multi-protocol storage appliance 100 is illustratively embodied as a storage system comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130. An example of a multi-protocol storage appliance that may be advantageously used with the present invention is described in co-pending and commonly assigned U.S. patent application Ser. No. 10/215,917 filed Aug. 9, 2002 titled A Multi-Protocol Storage Appliance that Provides Integrated Support for File and Block Access Protocols, which application is hereby incorporated by reference as though fully set forth herein.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 125 couples the storage appliance to a plurality of clients 160a,b over point-to-point links, wide area networks, virtual private networks implemented over a public network (Internet) or a shared local area network, hereinafter referred to as an illustrative Ethernet network 165. For this NAS-based network environment, the clients are configured to access information stored on the multi-protocol appliance as files. Therefore, the network adapter 125 may comprise a network interface card (NIC) having the mechanical, electrical and signaling circuitry needed to connect the appliance to a network switch, such as a conventional Ethernet switch 170. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160a running the Windows operating system may communicate with the storage appliance 100 using the Common Internet File System (CIFS) protocol over TCP/IP. On the other hand, a client 160b running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA offloads fiber channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1–2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. However, other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

To facilitate access to the disks 130, the storage operating system 200 implements a write-anywhere file system that cooperates with virtualization modules to provide a function that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
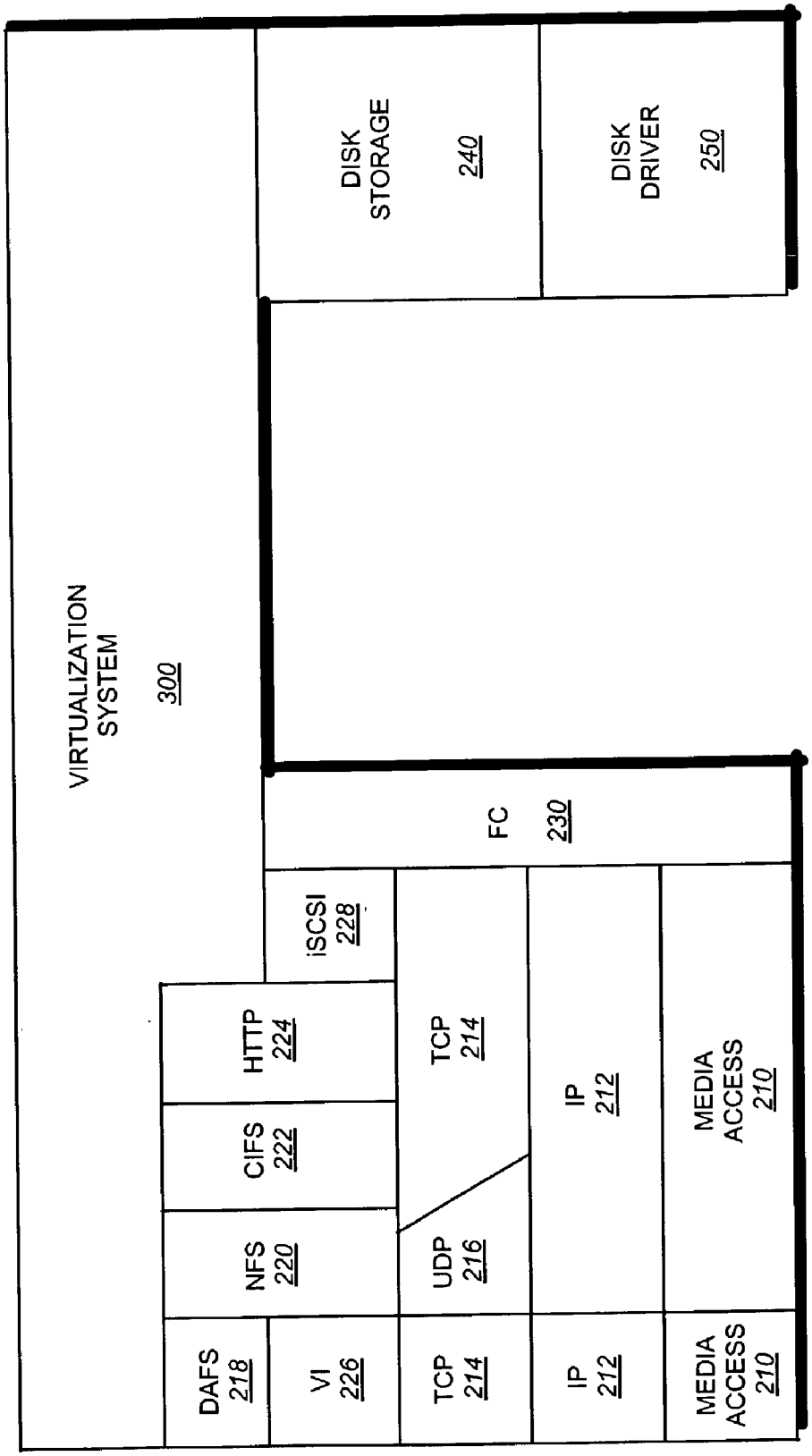
FIG. 2 is a schematic block diagram of a storage operating system of the multi-protocol storage appliance that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Figure 3:
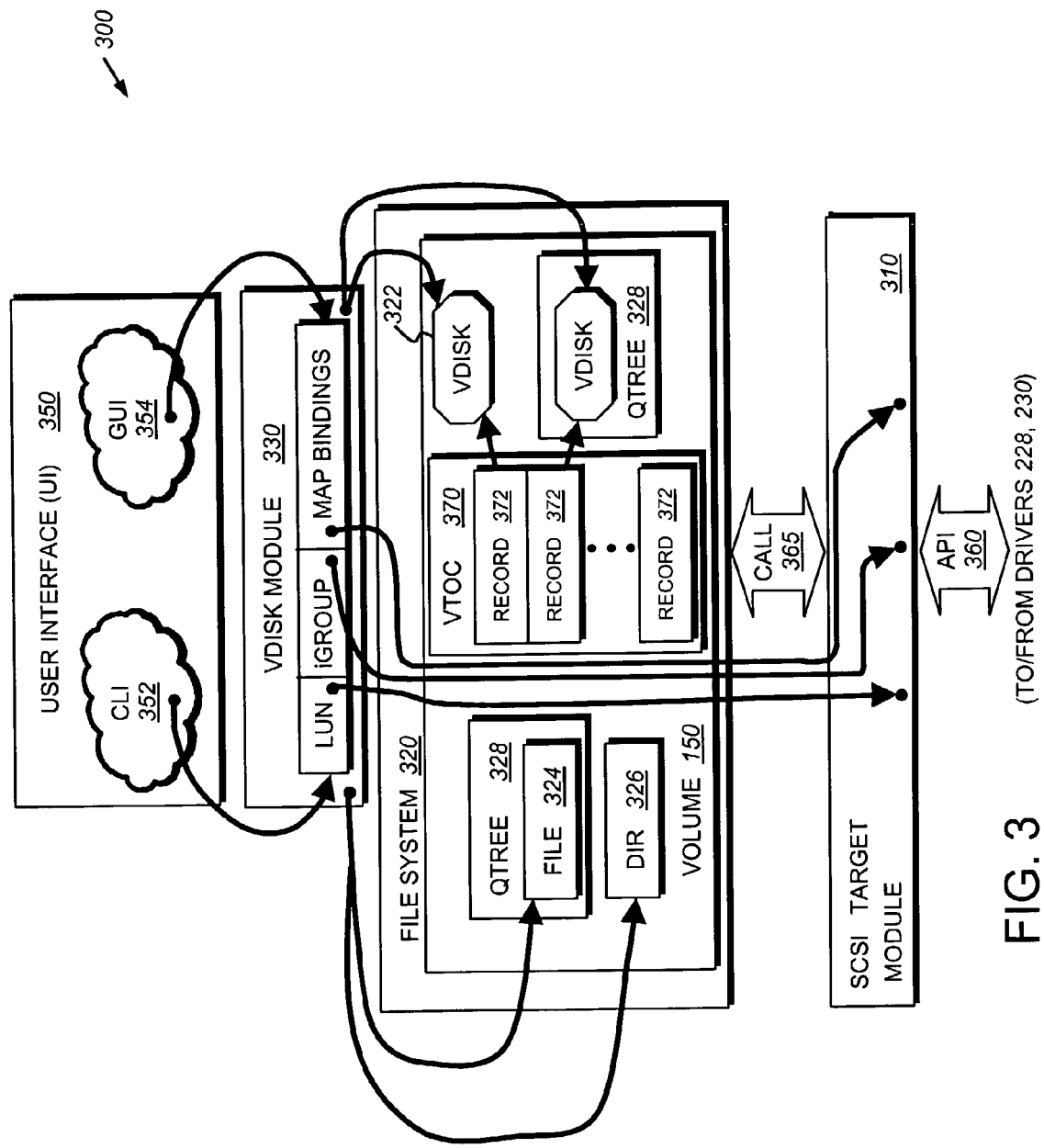
FIG. 3 is a schematic block diagram of a virtualization system that is implemented by a file system interacting with virtualization modules of the storage operating system.

Bridging the disk software layers with the integrated network protocol stack layers is a virtualization system 300. FIG. 3 is a schematic block diagram of the virtualization system 300 that is implemented by a file system 320 interacting with virtualization modules illustratively embodied as, e.g., vdisk module 330 and SCSI target module 310. It should be noted that the vdisk module 330, the file system 320 and SCSI target module 310 can be implemented in software, hardware, firmware, or a combination thereof. The vdisk module 330 is layered on the file system 320 to enable access by administrative interfaces, such as a streamlined user interface (UI 350), in response to a system administrator issuing commands to the multi-protocol storage appliance 100. In essence, the vdisk module 330 manages SAN deployments by, among other things, implementing a comprehensive set of vdisk (lun) commands issued through the UI 350 by a system administrator. These vdisk commands are converted to primitive file system operations ("primitives") that interact with the file system 320 and the SCSI target module 310 to implement the vdisks.

The SCSI target module 310, in turn, initiates emulation of a disk or lun by providing a mapping procedure that translates luns into the special vdisk file types. The SCSI target module is illustratively disposed between the FC and iSCSI drivers 228, 230 and the file system 320 to thereby provide a translation layer of the virtualization system 300 between the SAN block (lun) space and the file system space, where luns are represented as vdisks 322. To that end, the SCSI target module has a set of application programming interfaces (APIs 360) that are based on the SCSI protocol and that enable a consistent interface to both the iSCSI and FCP drivers 228, 230. By "disposing" SAN virtualization over the file system 320, the multi-protocol storage appliance reverses the approaches taken by prior systems to thereby provide a single unified storage platform for essentially all storage access protocols.

The file system 320 is illustratively a message-based system; as such, the SCSI target module 310 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 310 passes the message into the file system layer 320 as, e.g., a function call 365, where the operation is performed.

The file system provides volume management capabilities for use in block-based access to the information stored on the storage devices, such as disks. That is, in addition to providing file system semantics, such as naming of storage objects, the file system 320 provides functions normally associated with a volume manager. These functions include (i) aggregation of the disks, (ii) aggregation of storage bandwidth of the disks, and (iii) reliability guarantees, such as mirroring and/or parity (RAID), to thereby present one or more storage objects layered on the file system. A feature of the multi-protocol storage appliance is the simplicity of use associated with these volume management capabilities, particularly when used in SAN deployments.

The file system 320 illustratively implements the WAFL file system having an on-disk format representation that is block-based using, e.g., 4 kilobyte (kB) blocks and using inodes to describe the files 324. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292, titled Method for Maintaining Consistent States of a File System and for Creating User-Accessible Read-Only Copies of a File System by David Hitz et al., issued Oct. 6, 1998, which patent is hereby incorporated by reference as though fully set forth herein.

Figure 4:
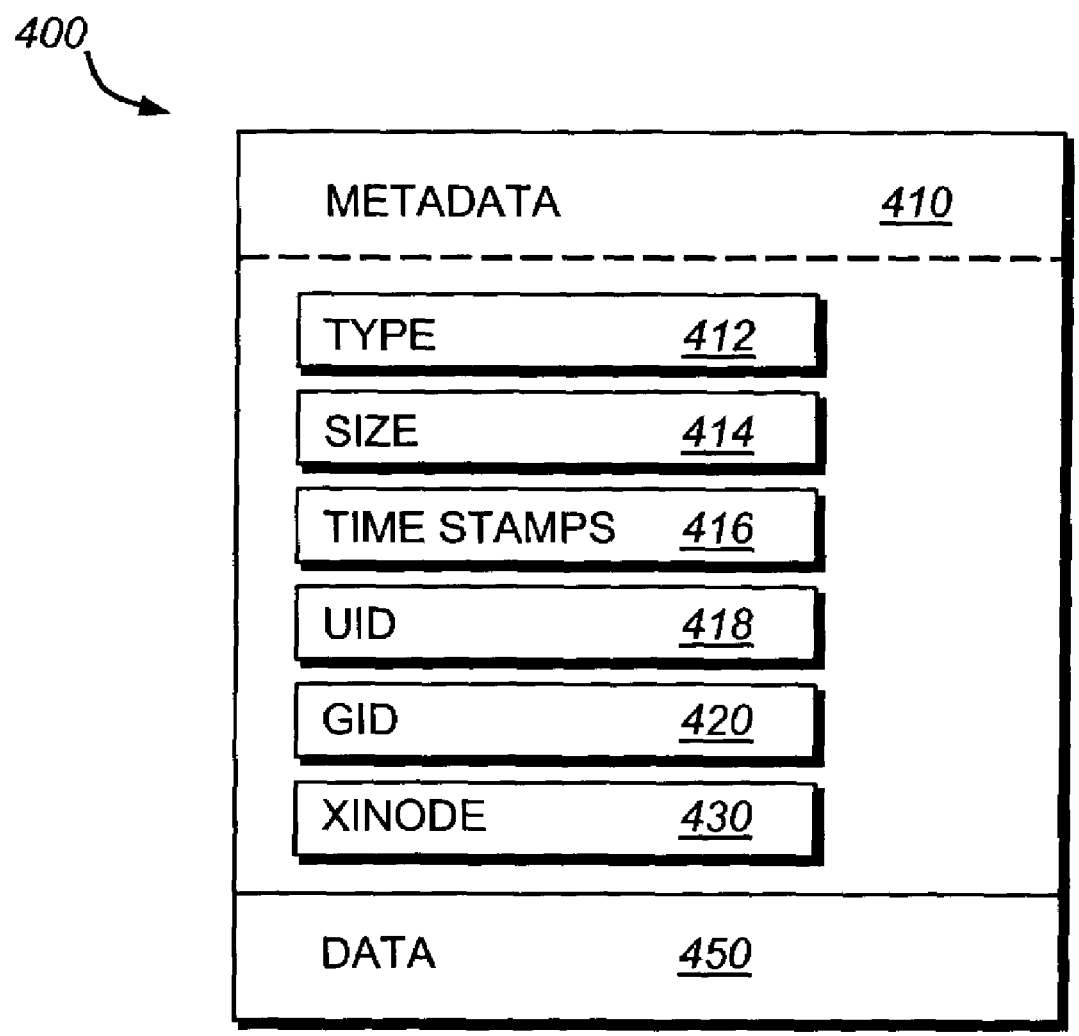
FIG. 4 is a schematic block diagram of an on-disk inode data structure that may be advantageously used with the present invention.

FIG. 4 is a schematic block diagram illustrating an on-disk inode 400, which preferably includes a metadata section 410 and a data section 450. The information stored in the metadata section 410 of each inode 400 describes the file and, as such, includes the type (e.g., regular or directory) 412 of file, the size 414 of the file, time stamps (e.g., access and/or modification) 416 for the file and ownership, i.e., user identifier (UID 418) and group ID (GID 420), of the file. The metadata section 410 further includes a xinode field 430 containing a pointer that references another on-disk inode structure containing, e.g., access control list (ACL) information associated with the file or directory. The contents of the data section 450 of each inode, however, may be interpreted differently depending upon the type of file (inode) defined within the type field 412. For example, the data section 450 of a directory inode contains metadata controlled by the file system, whereas the data section of a regular inode contains user-defined data. In this latter case, the data section 450 includes a representation of the data associated with the file.

Specifically, the data section 450 of a regular on-disk inode may include user data or pointers, the latter referencing 4 kB data blocks on disk used to store the user data. Each pointer is preferably a logical volume block number to thereby facilitate efficiency among the file system and the disk storage (RAID) layer 240 when accessing the data on disks. Given the restricted size (128 bytes) of the inode, user data having a size that is less than or equal to 64 bytes is represented, in its entirety, within the data section of that inode. However, if the user data is greater than 64 bytes but less than or equal to 64 kB, then the data section of the inode comprises up to 16 pointers, each of which references a 4 kB block of data on the disk. Moreover, if the size of the data is greater than 64 kilobytes but less than or equal to 64 megabytes (MB), then each pointer in the data section 450 of the inode references an indirect inode that contains 1024 pointers, each of which references a 4 kB data block on disk. Each data block is loaded from disk 130 into memory 124 in order to access the data. In addition, the size field 414 of the metadata section 410 of the inode refers to the size of the file.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

Referring again to FIG. 3, the file system implements access operations to vdisks 322, as well as to files 324 and directories (dir 326) that coexist with respect to global space management of units of storage, such as volumes 150 and/or qtrees 328. A qtree 328 is a special directory that has the properties of a logical sub-volume within the name-space of a physical volume. Each file system storage object (file, directory or vdisk) is illustratively associated with one qtree, and quotas, security properties and other items can be assigned on a per-qtree basis. The vdisks and files/directories may be layered on top of qtrees 328 that, in turn, are layered on top of volumes 150 as abstracted by the file system "virtualization" layer 320.

Note that the vdisk storage objects in the file system 320 are associated with SAN deployments of the multi-protocol storage appliance, whereas the file and directory storage objects are associated with NAS deployments of the appliance. The files and directories are generally not accessible via the FC or SCSI block access protocols; however, a file can be converted to a vdisk and then accessed by either the SAN or NAS protocol. The vdisks are accessible as luns from the SAN (FC and SCSI) protocols and as files by the NAS (NFS and CIFS) protocols.

While vdisks are self-contained objects containing all data necessary for proper operation and authorization, a vdisk table of contents (VTOC 370) is provided as a performance enhancement to finding and loading vdisks. The VTOC is not necessary for correct operation and can be reconstructed dynamically by a scan of the vdisks. The VTOC 370 is a per-volume data structure stored in a metadata file that is used to optimize location determination and initialization of persistent vdisks 322 in a volume 150. The VTOC 370 comprises one or more records 372, wherein each record includes flags and file entry information that, as noted, can be dynamically reconstructed from information stored in an encapsulated storage object representing the vdisk within the file system 320. In particular, each record 372 includes file entries containing (i) a file identifier (inode number) on the volume, (ii) generation number of the vdisk (lun) inode; and (iii) directory information. The directory information, in turn, comprises a file block number in a parent directory (qtree root) containing an entry for the vdisk, along with an index of directory entries in a parent directory block.

The present invention relates to a storage virtualization selection technique that "automates" a virtualization selection process to layer vdisks 322 over a volume 150 of the file system 320. In response to a user request (command) to create a vdisk, the file system aggregates physical storage of a set of disks 130 or portions (extents or "slices") of disks into a pool of blocks that can be dynamically allocated to form the vdisk 322. The file system also provides reliability guarantees for the vdisks in accordance with its underlying architecture. That is, the file system 320 organizes its storage within volumes created among the managed disks. The vdisk 322 is thereafter created as a named storage object within a volume 150 and, thus, inherits (assumes) the underlying reliability configuration associated with that volume. Notably, the portions are aggregated and allocated as a vdisk with reliability guarantees without further involvement of the user of the storage appliance, such as a system administrator.

Specifically, storage of information on the disks 130 of the multi-protocol storage appliance is not typed; only "raw" bits are stored on the disks. The file system 320 is configured to write (store) the information on the disks as long, continuous stripes across those disks in accordance with input/ output (I/O) storage operations that aggregate the bandwidth of all the disks of a volume. According to the inventive technique, the file system organizes that information as vdisks across the disks of the volume. When information is retrieved from the vdisks, the I/O operations are not directed to disks specified by a user. Rather, those operations are transparent to the user because the file system "stripes" that data across all the disks of the volume in a reliable manner according to its write anywhere layout policy. Thus, the vdisk 322 does not have to be explicitly configured because the virtualization system 300 creates a vdisk in a manner that is transparent to the user.

As noted, the file system 320 organizes information as named file, directory and vdisk objects within volumes 150 of disks 130. Underlying each volume 150 is a collection of RAID groups 140–144 that provide protection and reliability against disk failure(s) within the volume. The information serviced by the multi-protocol storage appliance is protected according to an illustrative RAID 4 configuration. This level of protection may be extended to include, e.g., synchronous mirroring on the appliance platform. A vdisk 322 created on a volume that is protected by RAID 4 "inherits" the added protection of synchronous mirroring if that latter protection is specified for the volume 150. In this case, the synchronous mirroring protection is not a property of the vdisk but rather a property of the underlying volume and the reliability guarantees of the file system 320. This "inheritance" feature of the multi-protocol storage appliance simplifies management of a vdisk because a system administrator does not have to deal with reliability issues.

A vdisk is a special file type in a volume that derives from a plain (regular) file, but that has associated export controls and operation restrictions that support emulation of a disk. More specifically, the vdisk 322 is a multi-inode object comprising a special file mode and at least one associated stream inode that are managed as a single, encapsulated storage object within the file system 320. The vdisk 322 illustratively manifests as an embodiment of the stream inode that, in cooperation with the special file inode, creates a new type of file storage object having the capacity to encapsulate specific security, management and addressing (export) information. An example of a stream inode object that may be advantageously used with the present invention is described in U.S. patent application Ser. No. 09/891,159 now U.S. Pat. No. 6,643,654 issued Nov. 4, 2003, titled System and Method for Representing Named Data Streams Within an On-Disk Structure of a File System, by K. Patel, which application was filed on Jun. 25, 2001 and is incorporated by reference as though frilly set forth herein.

According to an aspect of the invention, the storage virtualization technique de-couples physical disk size limitations and underlying physical structure from the disk or lun presented to a client. A user may specify "right size" storage as a block device (vdisk) for use by a client using, e.g., a construct that eases management from a client perspective with respect to the vdisk that appears as a physical disk. That is, the vdisk is illustratively a fixed size object that is allocated from a global storage pool of the file system by requesting a specific size using a simple "lun create" command, either through a command line interface (CLI 32) or a graphical user interface (GUI 354).

Although the vdisk is not a physical disk within the multi-protocol storage appliance, the storage virtualization technique "emulates" a physical disk, i.e., in a manner that is transparent to the user and client. One important emulation property of a disk implemented by the technique is that the vdisk cannot be created nor destroyed (removed) except through the CLI or GUI. Implicit in this property is while it is accessible over a NAS protocol (following an explicit action via command to share), a vdisk cannot be implicitly extended by a NAS operation writing outside its allocated space. The vdisk may be resized, e.g., made larger ("grow") or smaller ("shrink"), in place without a copy operation and in a manner transparent to the client. Notably, the vdisk may grow or shrink under user control (e.g., via lun commands issued through the UI 350) while preserving block and NAS multi-protocol access to its application data. Additional storage space is allocated when the vdisk is grown; when shrunk, the extra space from the vdisk is returned to the global free pool. Moreover, the user (system administrator) has the ability to dynamically ("on-the-fly") create vdisks for use in conventional block access applications.

The inventive technique also simplifies management of the vdisks by identifying them in a storage device and with administration tools used on a client by simple names (consisting of user-defined letters and numbers). SAN clients typically identify and address disks by logical numbers or luns. However, the automated storage virtualization technique allows system administrators to manage vdisks and their addressing by logical names. To that end, the vdisk module 330 of the multi-protocol storage appliance maps logical names to vdisks. For example when creating a vdisk, the system administrator "right size" allocates the vdisk and assigns it a name that is generally meaningful to its intended application (e.g., /vol/vol0/database to hold a database).

The storage virtualization technique addresses the issue of performance limitations by defining a vdisk abstraction of a disk "on top of" the file system. This abstraction aggregates the bandwidth of the underlying disks by providing greater bandwidth for the vdisk than that obtainable by the concatenation of a smaller number of disk drives needed solely to satisfy space requirements. Additionally, delayed allocation policies and write coalescing of the file system can serve to optimize the bandwidth of the vdisk compared to a pure physical implementation. As noted, layering of the vdisk on top of the file system also allows the vdisk to inherit the reliability configuration (e.g., RAID 4 and/or synchronous mirroring) of the underlying volume.

Figure 5:
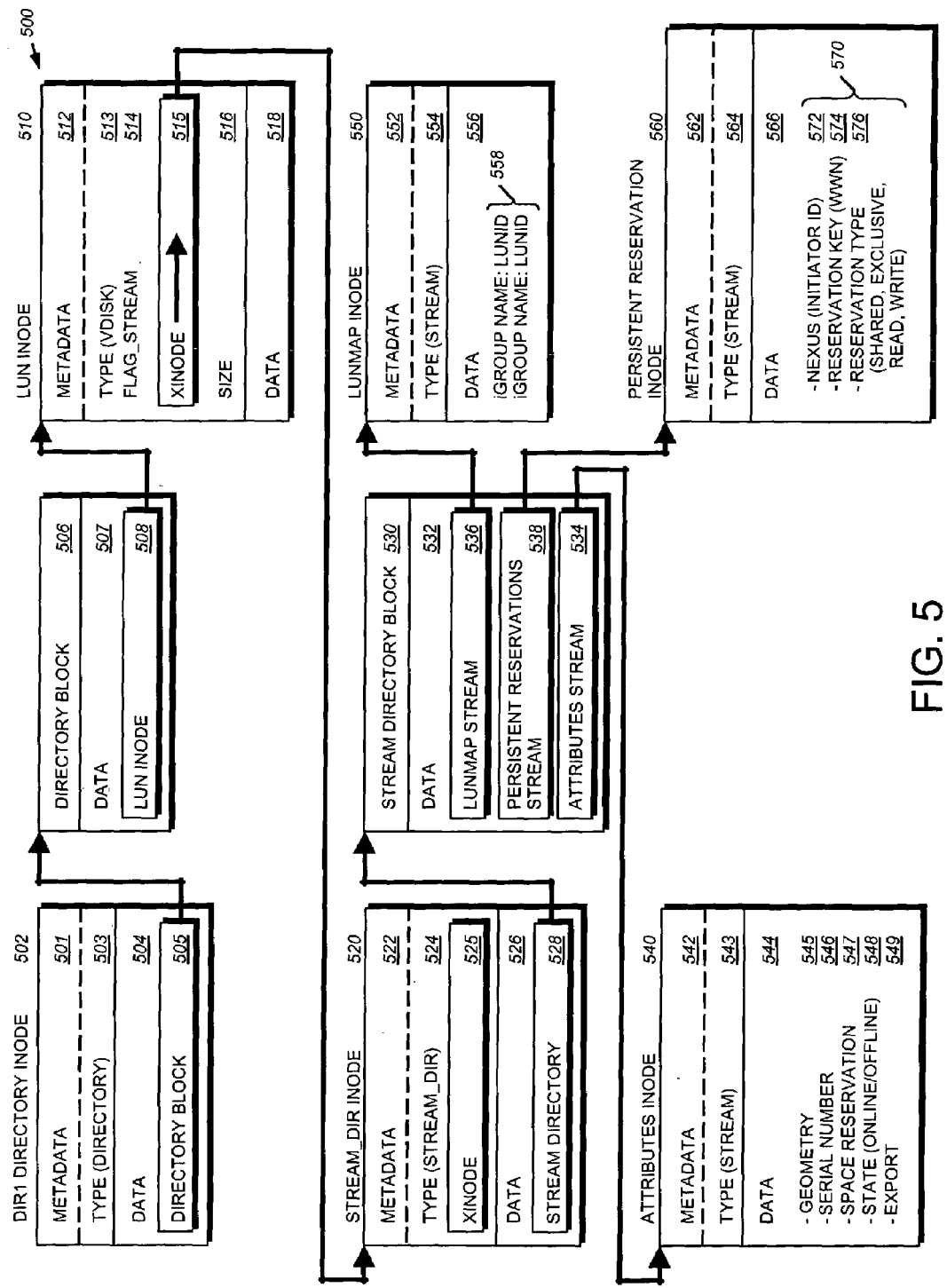
FIG. 5 is a schematic block diagram illustrating an on-disk representation of inode data structures, including logical unit number (lun) and attributes inodes of a virtual disk (vdisk), in accordance with the present invention.

According to another aspect of the invention, the storage virtualization technique provides an on-disk representation of the vdisk 322 stored on the multi-protocol storage appliance. FIG. 5 is a schematic block diagram illustrating an on-disk representation 500 of inode data structures, including vdisk (lun) and stream (attributes) inodes, in accordance with the present invention. A directory (DIR1) inode 502 includes a data section 504 of pointers 505 that references directory data blocks, one of which is directory block 506. The directory block includes a plurality of entries, each containing an external representation of an inode (i.e., the name of the inode) along with mapping information (i.e., the inode number) for that inode. One of those entries, entry 508, contains mapping information (e.g., a pointer) that references a lun inode 510.

The lun inode 510 is the special file inode that functions as a main container for storing data associated with the vdisk 322. That is, the lun inode comprises a data section 518 that may store the actual (user or application) data or pointers referencing 4 kB data blocks on disk used to store the data.

The data stored in this "default" container can be retrieved (read) and stored (written) by a client using conventional block access protocols, such as the SCSI protocol. When appropriately configured, a vdisk may also be accessed using conventional file-level access protocols, such as the NFS protocol. In this configuration, a vdisk "appears" to be a regular file for such accesses. The lun inode 510 also comprises a metadata section 512 containing metadata such as the type 513 (i.e., a special vdisk type) and size 516 of the vdisk that, upon creation of the inode, is zero. A flag_stream flag 514 identifies the lun inode 510 as having not only a default data container section 518 but also one or more stream "sections", as provided by stream_dir inode 520.

In order to access the stream_dir inode 520, the pointer of xinode field 515 in lun inode 510 is modified to reference that inode. The stream_dir inode 520 comprises a metadata section 522 that includes a type (stream_dir) field 524 and an xinode field 525 that references another on-disk inode structure containing, e.g., access control (such as CIFS permission) information associated with the vdisk. The inode 520 also includes a data section 526 containing a pointer 528 that references a stream directory data block associated with the vdisk, such as stream directory block 530. The stream directory block 530 comprises a data section 532 that includes a plurality of entries, each containing an external representation of a stream inode along with mapping information (i.e., the inode number) for that inode. One of those entries, entry 534, contains mapping information (e.g., a pointer) that references an attributes (stream) inode 540.

The attributes inode 540 comprises a metadata section 542 that includes a type (stream) field 543 and a data section 544 that functions as a persistent store for holding various named attributes associated with the vdisk 322. Attributes are an implementation mechanism that is internal to the file system and not managed by users. These attributes include information that allows the vdisk to be exported as a logical unit number (lun) to, e.g., SAN clients. In addition, the attributes include information that allow the encapsulated vdisk to persist, e.g., over reboot operations, and enable management of the vdisk as a single disk object in relation to the SAN clients.

Examples of the attributes include, among others, geometry 545, SCSI serial number 546, space reservation 547, state (on-line/off-line) 548 and export information 549, the latter controlling access to the vdisk by, e.g., specifying a list of initiators to which the vdisk is exported (i.e., those that have permissions to access to the vdisk). The geometry information 545 pertains to the physical geometry of the vdisk 322 needed for emulation of a disk or lun. For example, the vdisk size (as provided by a user) is algorithmically converted to geometry information (e.g., cylinder size), which may be returned to a SAN client as representative of the disk or lun. Although the geometry 545 is illustratively shown as persistently stored in the attributes inode 540, in an alternate embodiment, the geometry information 545 may be calculated dynamically (on-the-fly).

Specifically, the resizability of a vdisk is considered during vdisk creation and geometry selection. A minimum 10× resize capability is illustratively factored into selection of initial disk geometry. That is, the initial requested size of the vdisk is increased by 10× to calculate a resulting cylinder size used as the basis for the geometry. The resulting cylinder size is also a limiting factor on how large a vdisk can be resized. The geometry information is constant; i.e., once the vdisk is created, most all aspects of its geometry are fixed. Only the number of cylinders may change which, in the illustrative embodiment, has a maximum value of 65,535.

Other entries 536, 538 of the stream directory block 530 contain mapping information (e.g., pointers) that references other stream inodes, such as a lunmap (stream) inode 550 and a persistent reservations (stream) inode 560. The lunmap inode 550 comprises a metadata section 552 that includes a type (stream) field 544 and a data section 556 that functions as a persistent store for holding a list 558 of name-value pairs. In the illustrative embodiment, the name is an initiator group (igroup) name and the value is a lun identifier (ID). An igroup is a logical named entity that is assigned to one or more addresses associated with one or more initiators (depending upon whether a clustered environment is configured). These addresses may comprise WWN addresses or iSCSI IDs. A "lun map" command is used to export one or more vdisks to the igroup, i.e., make the vdisk(s) "visible" to the igroup. In this sense, the "lun map" command is equivalent to an NFS export or a CIFS share. The WWN addresses or iSCSI IDs thus identify the clients that are allowed to access those vdisks specified by the lun map command.

The persistent reservations inode 560 comprises a metadata section 562 that includes a type (stream) field 564 and a data section 566 that functions as a persistent store for holding a list 570 of persistent reservation records that provide ownership and access information relating to the vdisk. Persistent reservations are described in SCSI-3 Primary Commands-3, by Committee T10 of the National Committee for Information Technology Standards. Each persistent reservation record comprises a nexus (initiator ID) 572, a reservation key (WWN) 574 and a reservation type (shared, exclusive, read, write) 576.

In sum, the novel vdisk storage object is structured to contain data and metadata needed to control and manage that object in a single storage entity that is easy to manage within the framework of the storage operating system 200 executing on the multi-protocol storage appliance 100. To that end, the vdisk (data and attributes) is managed as a single encapsulated unit within the file system. This "encapsulation" property enables applications executing on the storage appliance to operate with the vdisk without having to be recoded. The encapsulated association of data and attributes also ensures preservation during data protection operations. For example, the encapsulation property enables "binding" of the data and attributes associated with an encapsulated vdisk storage entity when backing up that entity during, e.g., an asynchronous mirroring operation.

Specifically, the binding between the data (file inode) and attributes (stream inode) of a vdisk creates a single encapsulated object that is "self-describing" in that it contains all the information necessary to, e.g., access that object. Thus, no "external" information is needed to describe the vdisk object. It should be noted that there is no binding between a vdisk and disk blocks during write operations (or read operations when defragmentation takes place transparently "on-the-fly"). The disk blocks are mapped to logical block addresses of an object residing in the file system. In this case, the file system functions as a dynamic volume manager. This decoupling is a result of using the file system as an underlying storage manager.

According to the invention, the vdisk has a number of other properties, including being "spaced reserved". That is, unlike regular files that may be of arbitrary size and that may accommodate continuous write operations that increase the sizes of the files, the vdisk is limited to the storage space specified when it is created. A created vdisk may, however, be explicitly resized in order to increase its storage space. A vdisk is also a "sparse" file type in the sense that it consumes no storage space at creation and, therefore, does not have to be fully populated. The file system only allocates storage space, e.g., blocks, for the vdisk as data is stored in those blocks; therefore, the vdisk functions as a "placeholder" that does not have pre-allocated storage.

When a vdisk is created with a specific size, the space reservation property ensures that storage space corresponding to the specified size is always reserved within the file system despite creation of additional files and vdisks, and generation of persistent images of the file system. The sparse file type property further ensures that a write operation does not fail to a vdisk (which would be equivalent to a disk failure from the perspective of a SAN client). This guarantee that write operations to existing vdisks always complete is needed to support transparency to a client.

An advantage of the sparse file property is that creation of a vdisk (e.g., "lun create") occurs substantially instantaneously. Since storage space associated with the vdisk is not pre-allocated, creation of the vdisk occurs fast and efficiently with only accounting information initially needed. Blocks of storage are thereafter allocated as write operations occur to the vdisk. In this context, pre-allocation of blocks involves initializing ("zeroing") the contents of those blocks which, for a large sized disk, could consume a substantial amount of time. Not only does this property allow rapid creation of a vdisk, it also supports data integrity and privacy (i.e., there is no need to initialize data nor to destroy old data).

Figure 6:
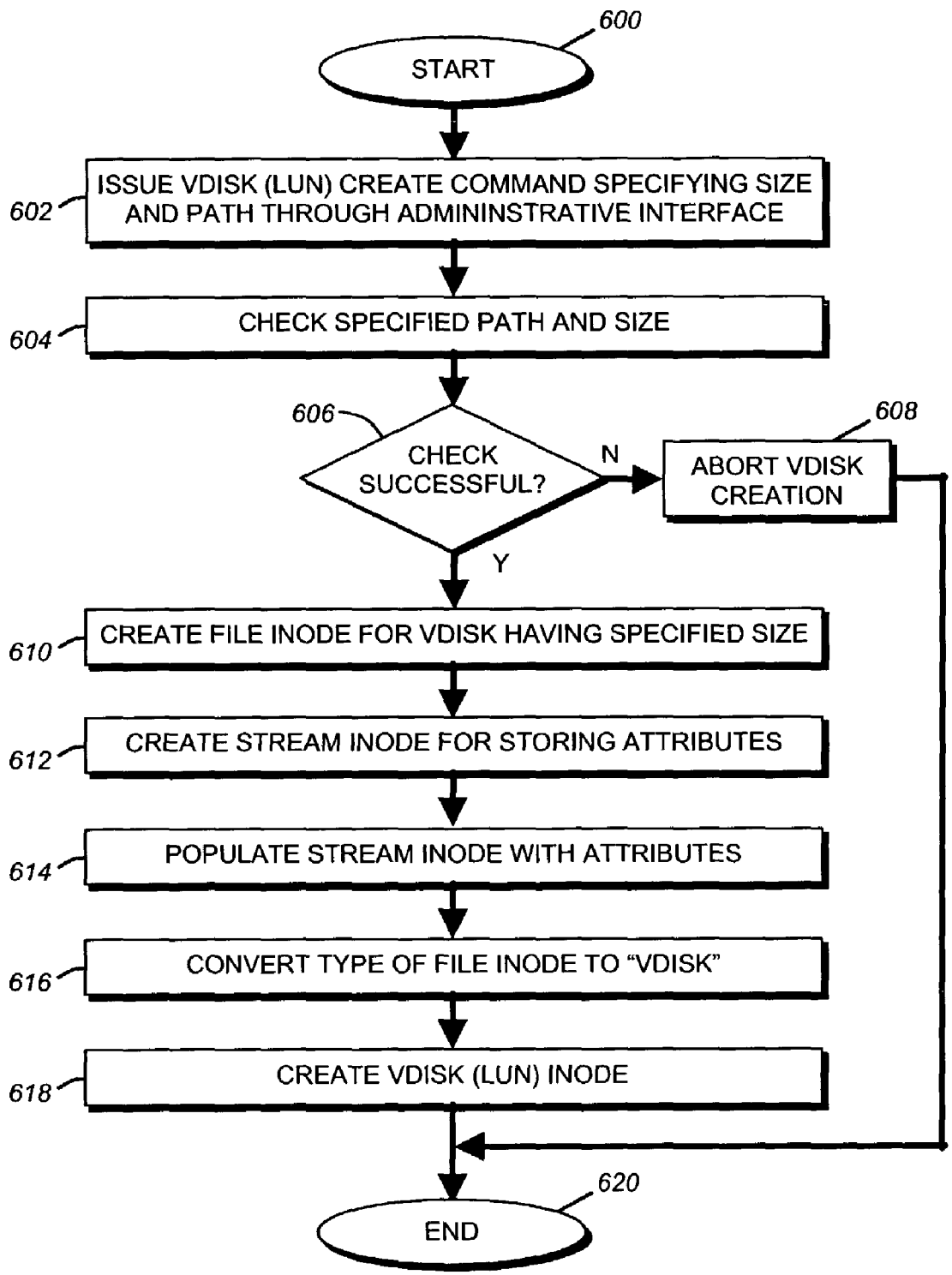
FIG. 6 is a flowchart depicting an illustrative sequence of steps involved when creating a vdisk according to the present invention.

FIG. 6 is a flowchart depicting an illustrative sequence of steps involved when creating a vdisk according to the present invention. The sequence starts at Step 600 and proceeds to Step 602 where a user (system administrator) creates a vdisk by issuing a vdisk ("lun create") command through, e.g., CLI 352, GUI 354 or similar administrative interfaces associated with the multi-protocol storage appliance. From the perspective of a user, the lun create command is an atomic operation that specifies creation of a vdisk (lun), along with the desired size of the vdisk and a path descriptor (full pathname) specifying the location of the vdisk. Note that the path descriptor includes identification of a volume and directory over which the vdisk (as identified by a special file name) is layered. In response, the file system 320 cooperates with the vdisk module 330 to "virtualize" the storage space provided by the underlying disks and create a vdisk as specified by the create command. To that end, the vdisk module 330 processes the vdisk command to "call" primitive operations ("primitives") in the file system 320 that implement high-level notions of vdisks (luns).

For example, the vdisk module cooperates with the file system 320 to check the specified path descriptor and size in Step 604. This check operation verifies that (i) the volume specified within the path descriptor exists, (ii) the (special file) name has not been previously allocated in the specified volume, and (iii) there is sufficient storage space for the created vdisk within the specified volume. A determination is then made in Step 606 as to whether the specified path descriptor and size successfully check. If not, vdisk creation is aborted in Step 608 and the sequence ends at Step 620. If the path descriptor and size do check, the file system and the vdisk module cooperate to create a file inode associated with the vdisk and set the specified size for that inode (Step 610). At step 610 of the vdisk creation process, a regular (plain) file is created in accordance with, e.g., a create file inode (create_file) primitive.

Thereafter, in Step 612, a stream inode is created in accordance with a create stream inode (create_stream) primitive. This stream inode is created for purposes for storing attributes associated with ("bound to") the vdisk to be created. In Step 614, the stream inode is populated with attributes provided by the user. Here, a primitive (stream_write) is executed that stores information in the stream inode. The attributes may include, among others, the state of the vdisk, permissions for sharing the vdisk over network file system protocols and SCSI inquiry information, e.g., a SCSI serial number. Note that a file owner and group ID parameter is set for use when the vdisk is exported over the network file system protocols. Space reservation guarantees are also set so that write operations to the vdisk do not fail. Another primitive is then executed to convert the type of the file inode from regular to "vdisk" (Step 616), to thereby create the vdisk (lun) inode in Step 618. Note that conversion of the file type from regular to vdisk in Step 616 protects against possible corruption of the file system. The sequence then ends in Step 620.

While there has been shown and described an illustrative sequence of steps for creating a vdisk in accordance with the inventive technique, it is to be understood that various other adaptations and modifications may be made within the spirit and scope of the invention. For example, in an alternate embodiment, Steps 610–616 of the illustrative vdisk creation process may be altered to directly create a vdisk (lun) inode, including the stream inode and population of the stream inode with attributes. Moreover, it will be understood to those skilled in the art that other methods of construction may be employed that ensure such atomicity of creation from the perspective of a user in accordance with the principles of the inventive technique.

Advantageously, the vdisk manifests as an embodiment of a stream inode object that, in cooperation with a file inode object, creates a new, special type of file storage object having the capacity to encapsulate specific security, management and addressing (export) information. In particular, the vdisk encapsulates security information (e.g., access control and persistent reservation records) that restrict/control access to the vdisk, thereby providing multi-protocol access over either NAS or SAN (block) protocols while preserving data integrity. For example, read access to a vdisk over a NAS protocol may be allowed, while read/write access to the vdisk may be allowed over a SAN (block) protocol. However, write access to the vdisk over the NAS protocol is allowable if access over block protocols is denied. The special file type of the vdisk enhances management of a collection of vdisks for purposes such as inventory and recovery from back-up media. Moreover, the special type facilitates distinguishing of a vdisk for certain operations, such as space reservation, through support of the underlying file system.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. A method for creating a virtual disk (vdisk) on a storage system, the method comprising the steps of:
    supporting at least one file system by the storage system;
    aggregating physical storage of portions of disks into a pool of blocks;
    dynamically allocating the portions of the disks to form a vdisk; and
    providing reliability guarantees for the vdisk in accordance with an underlying architecture of the file system,
    wherein the steps of aggregating, dynamically allocating and providing are performed in response to a user request to create the vdisk and without further user involvement.

2. The method of claim 1 wherein the portions of the disks are extents.

3. The method of claim 1 further comprising the steps of:
    organizing storage of the file system within volumes created among the disks;
    creating the vdisk as a storage object within one of the volumes; and
    inheriting, on behalf of the vdisk, the underlying reliability configuration associated with the volume.

4. The method of claim 1 further comprising the step of one of growing and shrinking the vdisk under user control while preserving block and network attached storage (NAS) multi-protocol access to application data stored in the vdisk.

5. A system for creating virtual disks (vdisks) on a storage system, the system comprising:
    a storage operating system resident in a memory of the storage system and invoking storage operations in support of a file system configured to logically organize information as a hierarchical structure of vdisks within a volume of the storage system, each vdisk stored in the volume as a representation embodying a logical unit number (lun) inode functioning as a main container for storing data associated with the vdisk and at least one stream inode that functions as a persistent store for storing various attributes, wherein the lun inode and at least one associated stream inode are managed as a single encapsulated storage object within the file system.

6. The system of claim 5 wherein the at least one stream inode is an attributes inode.

7. The system of claim 6 wherein the lun inode comprises a data section that includes one of data and pointers referencing data blocks on the disk used to store the data.

8. The system of claim 7 wherein the lun inode further comprises a metadata section containing a type and size of the vdisk, the metadata section further containing a flag stream flag that identifies the lun inode as a data container and one or more stream sections.

9. The system of claim 6 wherein the attributes inode comprises a data section that functions as a persistent store for holding various named attributes associated with the vdisk, the attributes including information that allows the vdisk to be exported as a lun to clients of the storage system and that enable management of the vdisk as a single disk object in relation to the clients.

10. The system of claim 9 wherein the attributes further comprise at least one of serial number, space reservation, state and geometry information.

11. The system of claim 5 wherein each vdisk further embodies a lunmap inode that includes a data section functioning as a persistent store for holding a list of name-value pairs and a persistent reservations inode that includes a data section functioning as a persistent store for holding a list of persistent reservation records.

12. The system of claim 11 wherein the persistent reservation records provide ownership and access information relating to the vdisk.

13. The system of claim 5 further comprising a per-volume data structure stored in a metadata file that is used to optimize location determination and initialization of the vdisks in a volume.

14. The system of claim 13 wherein the per-volume data structure is a vdisk table of contents data structure comprising one or more records including file entry information that can be dynamically reconstructed from information stored in an encapsulated storage object representing the vdisk.

15. The system of claim 14 wherein each record includes file entries comprising:
    a file identifier on the volume;
    a generation number of the lun inode; and
    directory information including a file block number in a parent directory containing an entry for the vdisk, along with an index of directory entries in a parent directory block.

16. The system of claim 5 wherein the vdisk encapsulates security information that restricts access to the vdisk, thereby providing multi-protocol access over either network attached storage or storage area network protocols while preserving data integrity.

17. A method for automating a selection process to create a virtual disk (vdisk) in a storage system using at least one storage disk, the method comprising the steps of:
    issuing a lun create command through an administrative interface of the storage system, the lun create command specifying a size of the vdisk and a path descriptor of a location of the vdisk; and
    creating the vdisk in response to the lun create command, the vdisk created on the at least one storage disk.

18. The method of claim 17 further comprising the step of resizing the vdisk using information pertaining to geometry of the vdisk.

19. The method of claim 18 wherein the step of resizing further comprises the step of algorithmically converting the specified vdisk size to the geometry information, the geometry information providing a limiting factor on how large the vdisk can be re-sized.

20. The method of claim 19 wherein the geometry information is cylinder size.

21. A method for creating a virtual disk (vdisk) in a storage system using at least one storage disk, the method comprising the steps of:
    issuing a vdisk create command through an administrative interface of the storage system, the vdisk create command specifying a size of the vdisk and a path descriptor of a location of the vdisk;
    creating a file inode associated with the vdisk, the file inode having a regular file type;
    creating a stream inode for storing attributes associated with the vdisk;
    populating the stream inode with said attributes; and
    converting the file type of the file inode from regular to vdisk, thereby creating the vdisk on the at least one storage disk.

22. The method of claim 21 further comprising the steps of, after the step of issuing:
    checking the specified size and path descriptor at a virtualization system of the multi-protocol storage appliance;

if the path descriptor and size do not check, aborting creation of the vdisk; and if the path descriptor and size do check, proceeding to the step of creating a file inode.

23. The method of claim 21 wherein the step of creating a file inode further comprises the step of setting the specified size for the file inode.

24. The method of claim 21 wherein the attributes include a state of the vdisk, permissions for sharing the vdisk over network file system protocols and inquiry information.

25. The method of claim 24 wherein the step of populating further comprises the steps of:

setting a file owner and group identification parameter for use when the vdisk is exported over the network file system protocols; and setting space reservation guarantees so that write operations to the vdisk do not fail.

26. A system for automating a selection process to create virtual disks (vdisks) on a storage appliance, the system comprising:

a processor;

a memory coupled to the processor and having locations addressable by the processor;

at least one disk coupled to the memory and processor; and a storage operating system resident in the memory and invoking storage operations in support of a file system configured to logically organize information as a hierarchical structure of vdisks on the disk, each vdisk stored on the disk as a representation embodying a logical unit number (lun) inode functioning as a main container for storing data associated with the vdisk and an attributes inode that functions as a persistent store for storing various attributes, wherein the lun inode and attributes inode are managed as a single encapsulated storage object within the file system.

27. A method for automating a storage virtualization process to create a virtual disk (vdisk) on a storage appliance, the storage appliance using at least one storage disk, the method comprising the steps of:

issuing a vdisk create command through an administrative interface of the storage appliance, the vdisk create command specifying a size of the vdisk and a path descriptor of a location of the vdisk;

creating a file inode associated with the vdisk, the file inode having a vdisk file type;

creating a stream inode for storing attributes associated with the vdisk; and populating the stream inode with said attributes, the vdisk supported by the at least one storage disk.

28. The method of claim 27 wherein the vdisk create command is a lun create command.

29. Apparatus for layering a virtual disk (vdisk) on a file system implemented by a storage operating system of a multi-protocol storage appliance, the apparatus comprising:

means for aggregating physical storage of portions of disks into a pool of blocks;

means for dynamically allocating the portions of the disks to form a vdisk; and means for providing reliability guarantees for the vdisk in accordance with an underlying architecture of the file system, wherein the means for aggregating, dynamically allocating and providing are performed in response to a user request to create the vdisk and without further user involvement.

30. A computer readable medium containing executable program instructions for storage virtualization of a virtual disk (vdisk) of a file system implemented by a storage operating system of a storage system, the executable program instructions comprising program instructions for:

issuing a lun create command through an administrative interface of the storage system, the lun create command specifying a size of the vdisk and a path descriptor of a location of the vdisk; and creating a vdisk in response to the lun create command.

31. A method for storage virtualization of a virtual disk (vdisk) on a file system implemented on at least one storage disk, the method comprising the steps of:

providing an encapsulated storage object of the file system, the encapsulated storage object implemented on the at least one storage disk, the encapsulated storage object including a container for storing data associated with the vdisk and a persistent store for storing attributes associated with the vdisk; and accessing the encapsulated storage object as a logical unit number.

32. A method for implementing a virtual disk (vdisk) on one or more physical disks, comprising:

issuing a create vdisk command, the create vdisk command specifying a logical unit number (lun) and a size for the vdisk; and establishing the vdisk in response to the create vdisk command, the vdisk having a physical storage allocated over the one or more physical disks, and the vdisk being established without user involvement beyond issuing the create vdisk command.

33. The method as in claim 32, further comprising:
selecting the one or more physical disks from a pool of available physical disks.

34. The method as in claim 32, further comprising:
selecting the one or more physical disks from a pool of available physical disks by a storage operating system.

35. The method as in claim 32, further comprising:
allocating portions of the one or more physical disks for the vdisk by a storage operating system.

36. The method as in claim 32, further comprising:
organizing the one or more physical disks into a file system having volumes; and
creating the vdisk as a storage object within one of the volumes.

37. The method as in claim 32, further comprising:
organizing the one or more physical disks to have underlying reliability guarantees; and
providing the vdisk with reliability guarantees in response to the underlying reliability guarantees.

38. The method as in claim 32, further comprising:
growing a size of the vdisk under user control while maintaining access to data stored on the vdisk.

39. The method as in claim 32, further comprising:
shrinking a size of the vdisk under user control while maintaining access to data stored on the vdisk.

40. The method as in claim 32, further comprising:
associating a lun inode with the vdisk as a container for storing data associated with the vdisk.

41. The method as in claim 40, further comprising:
including a data section in the lun inode, the data section including data referencing blocks of data on a disk used to store the data.

42. The method as in claim 41, further comprising:
including in the data section in the lun inode pointers referencing blocks of data on a disk used to store the data.

43. The method as in claim 32, further comprising:
associating a stream inode with the vdisk, the stream inode functioning as a persistent store for storing attributes associated with the vdisk.

44. The method as in claim 43, further comprising:
including in the attributes information that allows the vdisk to be exported as a lun to clients of the storage system, and attributes that enable management of the vdisk as a single disk object by the clients.

45. The method as in claim 43, further comprising:
including in the attributes at least one of serial number, space reservation, state, and geometry information.

46. The method as in claim 32, further comprising:
including a lunmap inode that has a data section functioning as a persistent store for holding a list of name-value pairs, and a persistent reservation inode that includes a data section functioning as a persistent store for holding a list of persistent reservation records.

47. The method as in claim 32, further comprising:
providing persistent reservation records to provide ownership and access information relating to the vdisk.

48. The method as in claim 32, further comprising:
storing a data structure in a metadata file to optimize location of vdisks stored in a volume.

49. The method as in claim 32, further comprising:
storing a data structure in a metadata file to optimize initialization of vdisks stored in a volume.

50. The method as in claim 32, further comprising:
storing a vdisk table of contents of data structures having one or more records holding file entry information that can be dynamically reconstructed from information stored in an encapsulated storage object representing the vdisk.

51. The method as in claim 50, further comprising:
having a file identifier in the file entry information.

52. The method as in claim 50, further comprising:
having a generation number of the lun inode in the file entry information.

53. The method as in claim 50, further comprising:
having a directory information including a file block number in a parent directory containing an entry for the vdisk in the file entry information.

54. The method as in claim 50, further comprising:
having an index of directory entries in a parent directory block in the file entry information.

55. The method as in claim 32, further comprising:
encapsulating in the vdisk security information that restricts access to the vdisk thereby providing multi-protocol access over either network attached storage or storage area network protocols while preserving data integrity.

56. The method as in claim 32, further comprising:
using a lun create command as the vdisk create command.

57. The method as in claim 32, further comprising:
storing the vdisk on a RAID organized disk storage for the physical disks.

58. The method as in claim 32, further comprising:
creating the vdisk by a virtualization system without explicitly configuring the physical storage, so that the creation step is transparent to the user.

59. The method as in claim 32, further comprising:
dynamically reconstructing file entry information from information stored in an encapsulated storage object representing the vdisk.

60. The method as in claim 32, further comprising:
issuing the create vdisk command through a command line interface (CLI).

61. The method as in claim 32, further comprising:
issuing the create vdisk command through a graphical user interface (GUI).

62. An apparatus to implement a virtual disk (vdisk), comprising:
means for issuing a create vdisk command, the create vdisk command specifying a logical unit number (lun) and a size for the vdisk; and
means for establishing the vdisk in response to the create vdisk command, the vdisk having a physical storage allocated over one or more physical disks, and the vdisk being established without user involvement beyond issuing the create vdisk command.

63. The apparatus as in claim 62, further comprising:
means for selecting the physical disks from a pool of available physical disks by a storage operating system.

64. The apparatus as in claim 62, further comprising:
means for selecting the one or more physical disks from a pool of available physical disks by a storage operating system.

65. The apparatus as in claim 62, further comprising:
means for allocating portions of the one or more physical disks for the vdisk by a storage operating system.

66. A storage system apparatus for computer data, comprising:
a processor executing a storage operating system, the storage operating system accepting a create virtual disk command (create vdisk command), the create vdisk command specifying a logical unit number (lun) and a size for a virtual disk (vdisk); and
at least one physical disk, a physical storage for the vdisk being allocated over the at least one physical disks by the storage operating system in response to the create vdisk command, and the vdisk being established without user involvement beyond issuing the create vdisk command.

67. The apparatus of claim 66, further comprising:
a pool of available physical disks, the at least one physical disk selected from the pool of available physical disks, without user involvement beyond issuing the create vdisk command.

68. The apparatus of claim 66, further comprising:
a pool of available physical disks, the at least one physical disk selected from the pool of available physical disks by the storage operating system, without user involvement beyond issuing the create vdisk command.

69. The apparatus of claim 66, further comprising:
the at least one physical disk being divided into portions, selected ones of the portions being allocated for the vdisk, without user involvement beyond issuing the create vdisk command.

70. The apparatus of claim 66, further comprising:
a file system organized on the at least one physical disk, the file system having volumes, and the vdisk created as a storage object within one of the volumes.

71. The apparatus of claim 66, further comprising:
the at least one physical disk having underlying reliability guarantees, and the vdisk having reliability guarantees in response to the underlying reliability guarantees.

72. The apparatus of claim 66, further comprising:
user control to grow a size of the vdisk, while maintaining access to a data stored on the vdisk.

73. The apparatus of claim 66, further comprising:
user control to shrink a size of the vdisk, while maintaining access to a data stored on the vdisk.

74. The apparatus of claim 66, further comprising:
a lun inode serving as a container for data associated with the vdisk.

75. The apparatus of claim 66, further comprising:
a lun inode having a data section, the data section including data referencing blocks of data on a disk used to store the data.

76. The apparatus of claim 66, further comprising:
a lun inode having a data section, the lun inode having pointers referencing blocks of data on a disk used to store the data.

77. The apparatus of claim 66, further comprising:
a stream inode associated with the vdisk, the stream inode functioning as a persistent store for storing attributes associated with the vdisk.

78. The apparatus of claim 77, further comprising:
the attributes including information that allows the vdisk to be exported as a lun to clients of the storage system, and attributes that enable management of the vdisk as a single disk object by the clients.

79. The apparatus of claim 77, further comprising:
the attributes including at least one of serial number, space reservation, state, and geometry information.

80. The apparatus of claim 66, further comprising:
a lunmap inode that has a data section functioning as a persistent store for holding a list of name-value pairs, and a persistent reservation inode that includes a data section functioning as a persistent store for holding a list of persistent reservation records.

81. The apparatus of claim 66, further comprising:
persistent reservation records to provide ownership and access information relating to the vdisk.

82. The apparatus of claim 66, further comprising:
a metadata file to store data to optimize location of vdisks stored in a volume.

83. The apparatus of claim 66, further comprising:
a metadata file to store a data structure to optimize initialization of vdisks stored in a volume.

84. The apparatus of claim 66, further comprising:
a vdisk table of contents storing data structures having one or more records holding file entry information that can be dynamically reconstructed from information stored in an encapsulated storage object representing the vdisk.

85. The apparatus of claim 84, further comprising:
the file entry information including a file identifier.

86. The apparatus of claim 84, further comprising:
the file entry information including a generation number of the lun inode.

87. The apparatus of claim 84, further comprising:
the file entry information including directory information.

88. The apparatus of claim 84, further comprising:
the file entry information including a file block number in a parent directory containing an entry for the vdisk.

89. The apparatus of claim 84, further comprising:
the file entry information including a file block number in a parent directory containing an index of directory entries.

90. The apparatus of claim 66, further comprising:
security information encapsulated in the vdisk, the security information restricting access to the vdisk, thereby providing multi-protocol access over either network attached storage or storage area network protocols while preserving data integrity.

91. The apparatus of claim 66, further comprising:
a lun create command serving as the vdisk create command.

92. The apparatus of claim 66, further comprising:
the at least one physical disk organized as a RAID system to store the vdisk.

93. The apparatus of claim 66, further comprising:
a virtualization system to create the vdisk without explicitly configuring the physical storage, so that the creation step is transparent to the user.

94. The apparatus of claim 66, further comprising:
an encapsulated storage object representing the vdisk, information stored in the encapsulated storage object to dynamically reconstruct file entry information.

95. The apparatus of claim 66, further comprising:
a command line interface (CLI) for issuing the vdisk create command.

96. The apparatus of claim 66, further comprising:
a graphical user interface (GUI) for issuing the vdisk create command.

97. A computer readable media, comprising:
said computer readable media having instructions written thereon for execution on a processor for the practice of the method of claim 1, or claim 17, or claim 21, or claim 27, or claim 31, or claim 32.

* * * * *

UNITED STATES PATENT AND TRADEMARK OFFICE
CERTIFICATE OF CORRECTION

PATENT NO. : 7,107,385 B2 Page 1 of 1
APPLICATION NO. : 10/216453
DATED : September 12, 2006
INVENTOR(S) : Vijayan Rajan et al.

It is certified that error appears in the above-identified patent and that said Letters Patent is hereby corrected as shown below:

Col. 17, Claim 1, line 6, delete "a", substitute --the--;

Col. 19, Claim 29, line 60, delete "a", substitute --the--.

Signed and Sealed this

Twenty-third Day of October, 2007

JON W. DUDAS
*Director of the United States Patent and Trademark Office*